US006247808B1

(12) United States Patent
Ma et al.

(10) Patent No.: US 6,247,808 B1
(45) Date of Patent: *Jun. 19, 2001

(54) INK-JET PRINTING SYSTEM FOR IMPROVED PRINT QUALITY

(75) Inventors: Zeying Ma, San Diego; Keshava A. Prasad, San Marcos, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/064,706

(22) Filed: Apr. 22, 1998

(51) Int. Cl.$^7$ .................................................. G01D 11/00
(52) U.S. Cl. .................. 347/100; 106/31.27; 106/31.28; 523/160
(58) Field of Search .................... 347/100; 106/31.29, 106/31.6, 31.13, 31.26, 31.28, 31.27; 523/160, 161

(56) References Cited

U.S. PATENT DOCUMENTS

| | | | |
|---|---|---|---|
| 4,872,026 | 10/1989 | Rasmussen et al. | 346/140 |
| 5,006,582 | 4/1991 | Mancinelli | 524/271 |
| 5,053,494 | 10/1991 | Omura et al. | 534/642 |
| 5,085,698 | 2/1992 | Ma et al. | 106/20 |
| 5,091,005 | 2/1992 | Mueller et al. | 106/221 |
| 5,102,448 | 4/1992 | Parton et al. | 106/22 |
| 5,106,416 | 4/1992 | Moffatt et al. | 106/20 |
| 5,116,409 | 5/1992 | Moffatt | 106/22 |
| 5,133,803 | 7/1992 | Moffatt | 106/25 |
| 5,181,045 | 1/1993 | Shields et al. | 346/1.1 |
| 5,198,023 | 3/1993 | Stoffel | 106/22 R |
| 5,203,912 | 4/1993 | Greenwood et al. | 106/22 K |
| 5,231,131 | 7/1993 | Chu et al. | 524/504 |
| 5,272,201 | 12/1993 | Ma et al. | 524/505 |
| 5,320,668 | 6/1994 | Shields et al. | 106/20 R |
| 5,428,383 | 6/1995 | Shields et al. | 347/96 |
| 5,479,199 | 12/1995 | Moore et al. | 347/102 |
| 5,488,402 * | 1/1996 | Shields et al. | 347/96 |
| 5,518,534 | 5/1996 | Pearlstine et al. | 106/20 R |
| 5,531,816 | 7/1996 | Wickramanayake | 106/20 R |
| 5,549,740 * | 8/1996 | Takahashi et al. | 106/31.27 |
| 5,555,008 | 9/1996 | Stoffel et al. | 347/100 |
| 5,565,022 | 10/1996 | Wickramanayake | 106/22 R |
| 5,713,989 | 2/1998 | Wickramanayake | 106/31.6 |
| 5,713,993 | 2/1998 | Grezzo Page et al. | 106/31.85 |
| 6,022,908 * | 2/2000 | Ma et al. | 523/160 |
| 6,027,210 * | 2/2000 | Kurabayashi et al. | 106/31.75 |

FOREIGN PATENT DOCUMENTS

| | | | |
|---|---|---|---|
| 0556649 A1 | 8/1993 | (EP) | C09D/11/00 |
| 0586079A1 | 3/1994 | (EP) | C09D/11/00 |
| 0633142A1 | 1/1995 | (EP) | B41M/5/00 |

OTHER PUBLICATIONS

Hewlett–Packard Journal, vol. 45, No. 1 (Feb. 1994).

* cited by examiner

Primary Examiner—John Barlow
Assistant Examiner—Manish S. Shah (57) ABSTRACT

An ink-jet printing system is disclosed comprising a set of ink-jet inks comprising a first anionic ink comprising an aqueous vehicle, at least one first colorant, and at least one first anionic polymer; a second anionic ink comprising an aqueous vehicle; at least one second colorant, at least one second anionic polymer, and an acid additive having a pKa up to the pKa of the at least first polymer of the first ink; a third cationic ink comprising an aqueous vehicle, at least one third colorant, at least one third cationic polymer, and a pH in the range from about 2 to about 5; and a fourth anionic ink comprising an aqueous vehicle, at least one fourth anionic dye, and a precipitating agent. The printing system provides improved print quality, specifically, reduced bleed; improved edge-acuity, uniform area fills, and color quality; while maximizing lightfastness without sacrificing printing reliability.

22 Claims, 3 Drawing Sheets

INK-JET PRINTING SYSTEM FOR IMPROVED PRINT QUALITY

CROSS REFERENCE TO RELATED APPLICATIONS

The present application is related to U.S. application Ser. No. (unknown), entitled "Ink Set for Improved Print Quality," by Ma et al., assigned to same assignee as the present invention, and filed herewith.

FIELD OF INVENTION

The present invention relates to ink-jet printing systems, and, more particularly, to systems with improved bleed control.

BACKGROUND OF INVENTION

Ink-jet printing is a non-impact printing process in which droplets of ink are deposited on print media, such as paper, transparency film, or textiles. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Ink-jet printers offer low cost, high quality printing with relatively noise-free operation. As such, ink-jet printers have become a popular alternative to other types of printers. However, ink-jet printers are presently incapable of matching the level of throughput generated by laser printers due in large part to the relatively slow dry time of ink-jet inks as well as to the printer slow-down deriving from the resident bleed control algorithm in the printer. With particular regard to bleed control, there is a tendency among ink-jet inks to bleed into one another when printed in various colors on paper substrates. Bleed occurs as colors mix both on the surface of the paper substrate as well as within the substrate itself. In response to this problem, ink-jet printers commonly employ bleed control algorithms in an attempt to provide a border between colors that is clean and free from the invasion of one color into another; however, this slows down the printer. In order to increase the level of throughput generated by ink-jet printers, the dry time of ink-jet inks should be improved, preferably in a manner that also affects bleed control.

Various solutions to the problem of black to color and color to color bleed have been proffered. Some solutions involve changing the ink environment to reduce bleed. For instance, heated platens and other heat sources, along with specially formulated paper, have been employed to reduce bleed. However, heated platens add cost to the printer, and specially formulated paper is more expensive than "plain" paper. Thus, using external paraphernalia to reduce bleed in ink-jet color printing is generally not cost effective. Another commonly employed method for reducing bleed involves the use of bleed control algorithms in ink-jet printers to provide borders between colors that are clean and free from the invasion of one color into another; however, such algorithms slow down the printer.

Other proposed solutions to the problem of bleed involve changing the composition of an ink-jet ink. For example, surfactants have been effectively used to reduce bleed in dye-based ink formulations; see, e.g., U.S. Pat. No. 5,106, 416 entitled "Bleed Alleviation Using Zwitterionic Surfactants and Cationic Dyes," issued to John Moffatt et al., U.S. Pat. No. 5,116,409 entitled "Bleed Alleviation in Ink-Jet Inks", issued to John Moffatt, and U.S. Pat. No. 5,133,803 entitled "High Molecular Weight Colloids Which Control Bleed", issued to John Moffatt, all assigned to the same assignee as the present application. However, surfactants increase the penetration rate of the ink into the paper, which may also result in the reduction of edge acuity. Moreover, the addition of surfactant-containing inks could cause puddles on the nozzle plates of the printhead, leading to poor drop ejection characteristics. Other solutions specific to dye-based ink compositions, disclosed in patents assigned to the present assignee, are found in U.S. Pat. No. 5,198,023, entitled "Cationic Dyes with Added Multi-Valent Cations to Reduce Bleed in Thermal Ink-Jet Inks", issued to John Stoffel, and U.S. Pat. No. 5,181,045, entitled "Bleed Alleviation Using pH Sensitive Dyes, issued to James Shields et al., both assigned to the same assignee as the present application.

U.S. Pat. No. 5,565,022, entitled "Fast Drying, Bleed-Free Ink-Jet Ink Compositions," assigned to the same assignee as the present application, and incorporated herein by reference, is directed to bleed control of dye-based ink compositions wherein the dye is either water-soluble or water-insoluble (i.e., solvent-soluble dye). More specifically, bleed control for such inks is achieved by dissolving the dye in either water or the solvent depending on the nature of the dye. The ink is in the form of a microemulsion which is an isotropic solution of water, a water-insoluble organic compound, and an amphiphile, there being sufficient amphiphile to solubilize the water-insoluble compound in water.

U.S. Pat. No. 5,531,816, entitled "Bleed-Alleviated, Waterfast, Pigment-Based Ink-Jet Ink Compositions," and U.S. Pat. No. 5,713,989, entitled "Bleed Alleviated Aqueous Pigment Dispersion-Based Ink-Jet Ink Compositions," both assigned to the same assignee as the present application, and incorporated herein by reference, are directed to bleed control of solvent-dispersed pigment-based, and aqueous pigment-based ink-jet ink compositions, respectively. More specifically, bleed control for such inks is achieved by dispersing the pigment and keeping it in solution in the form of a microemulsion. Again, however, these solutions to bleed are not directed to dye-based inks, but rather are specifically directed to dispersed pigment-based inks.

Furthermore, the suitable ink-jet ink has to provide for other performance attributes as well. In order to obtain a robust print sample, the ink should be capable of producing lightfast images once printed on the print medium. Typically, lightfastness has been achieved for black ink by using pigment-based inks. However, the color inks; e.g., magenta, yellow, and cyan; typically use dye as the coloring agent, thus leading to less lightfast images. Another problem, has been the selective bleed control—even though bleed control has been achieved between some of the colors, it has not been achieved between all possible combinations between the four major colors of black, magenta, yellow, and cyan.

Accordingly, a need exists for ink-jet printing systems that can provide improved print quality, specifically, reduced bleed; improved edge-acuity, uniform area fills, and color quality; while maximizing lightfastness without sacrificing printing reliability.

DISCLOSURE OF INVENTION

In accordance with the invention, an ink-jet printing system and a set of ink-jet print cartridges are disclosed comprising a a set of ink-jet inks for improved print quality, specifically, reduced bleed; improved edge-acuity, uniform area fills, and color quality; while maximizing lightfastness without sacrificing printing reliability. The set of ink-jet inks comprises at least four individual ink where each ink is capable of interacting with the other in order to reduce bleed therebetween.

The set of ink-jet inks comprises: a first anionic ink comprising an aqueous vehicle, at least one first colorant, and at least one first anionic polymer; a second anionic ink comprising an aqueous vehicle at least one second colorant, at least one second anionic polymer, and an acid additive having a pKa up to the pKa of the at least first polymer of the first ink; a third cationic ink comprising an aqueous vehicle, at least one third colorant, at least one third cationic polymer, and a pH in the range from about 2 to about 5; and a fourth anionic ink comprising an aqueous vehicle, at least one fourth anionic dye, and a precipitating agent.

The use of pigments in the inks provides for prints with excellent lightfastness. The mutual reaction scheme between the inks of the ink set enables the production of prints with enhanced print quality, bleed control, sharper line edge-acuity, uniform area fill and good color quality. Furthermore, inks made according to the present invention are media independent (e.g., coated paper, uncoated paper, film) and exhibit reliable printing performance.

DETAILED DESCRIPTION OF THE INVENTION

The present ink set comprises at least four inks, each of said inks having some ionic character. Each of said inks comprises an aqueous vehicle; at least one colorant which may be a pigment or a dye, or a combination thereof, provided that the charge characteristics are compatible with the rest of the ink components; and an ionic polymer having the same ionic characteristic as the ink. All combinations of pigmented or dye-based cationic and anionic aqueous ink jet inks are considered suitable. The polymer may be present in the form of a dispersant for pigmented inks or may be added to the ink independent of the colorant. As already noted, the polymer is of the same ionic character as the ink, i.e., cationic polymers for cationic inks and anionic polymers for anionic inks. The inks of the present invention are designed to interact with each other once applied onto the printing medium.

When referring to the "ionic character" of the ink compositions, it is well known in the art that the ink compositions themselves are not charged; they are neutral. Thus, the term "ionic character" refers to the charge carried by the major functional components of the ink composition in their ionic form. Such components typically are neutralized with a counter-ion so as to render the ink neutral. It is commonly understood in the art that cationic inks contain cationic components and anionic inks contain anionic components.

As used in the present invention, the term pigment will refers to a colorant that is insoluble in the aqueous vehicle, and includes disperse dyes.

All concentrations herein are in weight percent, unless otherwise indicated. The purity of all components is that employed in normal commercial practice for ink-jet inks. Now, the inks and their components will be described in detail below.

INK COMPOSITION

The ink set of the present invention comprises:
a first anionic ink comprising
   an aqueous vehicle,
   at least one first colorant, and
   a first anionic polymer;
a second anionic ink comprising
   an aqueous vehicle;
   at least one second colorant,
   a second anionic polymer;, and
   an acid additive having a pKa up to the pKa of the at least first polymer of the first ink;
a third cationic ink comprising
   an aqueous vehicle,
   at least one third colorant,
   a third cationic polymer, and
   a pH in the range from about 2 to about 5; and
a fourth anionic ink comprising
   an aqueous vehicle,
   at least one fourth colorant, and
   a precipitating agent.

Preferably, the at least one first anionic polymer has at least one neutralized carboxylic acid group; and the at least one second anionic polymer has at least one sulfonate or phosphonate group.

More preferably, the inks have the following properties:
   The First ink comprises an aqueous vehicle, a pigment, and a polymeric dispersant having at least one neutralized carboxylic acid group.
   The Second ink comprises an aqueous vehicle, a pigment, a polymeric dispersant having at least one sulfonate or phosphonate group, and a carboxylic acid additive having a pKa of up to about 3.5 in an amount sufficient to bring about the precipitation of the colorant in the First ink.
   The Third ink comprises an aqueous vehicle; a pigments; a cationic polymeric dispersant; and a pH in the range form about 2 to about 5, and more preferably from about 2.5 to about 4.
   The Fourth ink comprises an aqueous vehicle, an anionic water-based dye, a precipitating agent, and optionally a carboxylic acid additive. The optional carboxylic acid additive has a pKa up to about 3.5 in an amount sufficient to provide an ink pH in the range from about 2.7 to about 7. Preferably, the carboxylic acid additive is in amount sufficient to provide an ink pH in the range from about 2.7 to about 4, and most preferably, from about 2.9 to about 3.5.

The inks may further comprise additional ingredients known in the art of ink-jet printing. Such additional ingredients include, but are not limited to, biocides, surfactants, and co-solvents.

In an exemplary embodiment, when black, magenta, yellow, and cyan inks are prepared corresponding to the first through fourth inks, the following relationship may exist between the inks. However, it should be noted that the invention is not limited by the described relationship and the invention is only limited by the claims:

Carbon black pigment is used as the colorant in the first ink. The carbon black pigment in the first ink, black (K), is stabilized by a carboxylated polymeric dispersant (anionic) and the ink has a pH of about 8.

The magenta pigment in the second ink, magenta (M), is stabilized by a sulfonated or phosphonated polymeric dispersant (anionic). The magenta ink has a carboxylic acid additive and a pH of about 3.

The yellow pigment in the third ink, yellow (Y), is stabilized by a cationic polymeric dispersant, and the ink has a pH of about 3.

The cyan colorant in the fourth ink, cyan (C), is an anionic water-soluble dye.

The cyan ink further contains a precipitating agent, here a multivalent metal salt, and optionally a carboxylic acid additive. The ink has a pH of about 3.

The reaction between the black and magenta inks is caused by the pH difference between the two inks and the excess hydrogen ions from the magenta ink. The black ink and the yellow ink react by virtue of the opposite charge between the dispersants for the black and the yellow pigments. The black ink and the cyan ink react due to the precipitation of the dispersed black pigment by the multivalent metal ions (precipitating agent). Additionally, when the fourth ink (e.g., cyan) contains the optional acid, the pH difference between the cyan and the black ink further enhances the precipitation of the colorant in the black ink.

The reaction between the magenta and the yellow inks is caused by the opposite charge between the dispersants for the magenta and the yellow pigments. The magenta and the cyan inks react by virtue of the multivalent metal precipitating the dispersed magenta pigment.

And, finally, the yellow ink and the cyan ink react due to the opposite charge between the dispersed yellow pigment and the cyan dye.

SUBSTRATES

Substrates that may be selected in practicing this invention include all of those commonly used in generating printed elements. For ink-jet ink applications, cellulose and non-cellulose type substrates may be used to advantage, with the cellulose type substrates, such as paper, being preferred. If sized, the degree of sizing for the substrate can be from 1 second to 1000 seconds as measured by the Hercules size test (HST), as described in TAPPI standards T530 PM-83. The substrate is chosen so its HST value is compatible with the volume and composition of the ink drop in the printer to be used. The preferred HST is in the range of 200 to 500 seconds, most preferably 350 to 400 seconds. Some useful papers include 100% bleached kraft composed of a blend of hard and soft wood, 100% wood free cotton vellum, and wood containing paper made translucent either by pulp beating or with additives. A preferred paper is Gilbert Bond paper (25% cotton) designated style 1057, manufactured by Mead Company, Dayton, Ohio. Other substrates include cardboard, transparent films such as polyethylene terephthalate, fabrics, etc.

AQUEOUS CARRIER MEDIUM

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

In the case of a mixture of water and a water-soluble solvent, the aqueous carrier medium usually contains from about 30% to about 95% water with the balance (i.e., 70 to 5%) being the water-soluble solvent. The preferred compositions are approximately 60% to about 95% water, based on the total weight of the aqueous carrier medium.

The amount of aqueous carrier medium in the ink is in the range of approximately 70 to 99.8%, preferably approximately 94 to 99.8%, based on total weight of the ink when an organic pigment is selected; approximately 25 to 99.8%, preferably approximately 70 to 99.8% when an inorganic pigment is selected; and 80 to 99.8% when a dye is selected.

COLORANTS

Pigment

As used herein, the term "pigment" refers to a colorant that is insoluble in the aqueous vehicle, and includes disperse dyes. A wide variety of organic and inorganic pigments, alone or in combination, may be selected to make the ink, examples of which are disclosed in U.S. Pat. No. 5,085,698. The term "pigment" as used herein means an insoluble colorant. The pigment particles are sufficiently small to permit free flow of the ink through the ink-jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is approximately 0.005 micron to 15 micron. Preferably, the pigment particle size should range from 0.005 to 5 micron and, next preferably, from 0.005 to 1 micron, and most preferably, from about 0.005 to 0.3 micron.

Disperse Dye

The color and amount of disperse dye used in the ink is largely a function of choice, being primarily dependent upon the desired color of the print, the purity of the dye, and its strength. The disperse dye may be present from about 0.1 to about 20%, by weight, preferably, from about 0.05 to about 8%, by weight, more preferably, from about 1 to about 5%, by weight, based on the total weight of the ink. Representative disperse dyes that may be useful in this invention are disclosed in U.S. Pat. No. 5,053,494; U.S. Pat. No. 5,203,912; and U.S. Pat. No. 5,102,448.

Water-Soluble Dyes

Depending on the ionic charge of the ink, cationic or anionic dyes may be selected for use in the present invention. The cationic dyes yield colored cations in aqueous solution. Types of cationic dyes that may be selected include the basic dyes, and some of the mordant dyes that are designed to bind acidic sites on substrates such as fibers. Cationic dyes that may be used to advantage include azo compounds, diphenylmethane compounds, triarylmethane compounds, xanthene compounds, acridine compounds, quinoline compounds, methine compounds, polymethine compounds, thiazoles, indamines, indophenols, azine compounds, oxazine compounds and thiazine compounds. The selected cationic dye needs to have sufficient solubility in the aqueous carrier medium to produce the desired color intensity and avoid poor print head performance. Examples of cationic water-soluble dyes include, but are not limited to, CI: Basic Violet 10, Basic Violet 11, Basic Violet 14, Basic Blue 3, Basic Blue 7, Basic Blue 9, Basic Yellow 11, Basic Yellow 28, Basic Yellow 37, and Basic Black 1.

Anionic dyes yield colored anions in aqueous solution. Types of anionic dyes commonly used in aqueous ink jet inks are the Acid, Direct, Food, Mordant, and Reactive dyes. Representative anionic dyes that may be used to advantage include nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigo compounds and phthalocyanine compounds.

Examples of anionic water-soluble dyes include, but are not limited to, C.I. Food Black 2, C.I. Direct Black168, and C.I. Direct Black 22, C.I. Acid Red 18, C.I. Acid Red 27, C.I. Acid Red 52, C.I. Acid Red 289, C.I. Acid Yellow 23, and C.I. Direct Blue 199, C.I. Acid Blue 9, Direct Blue 169, and their monovalent alkali ions such as $Na^+$, $Li^+$, $Cs^+$; and their $NH_4^+$, TMA (tetramethyl ammonium), and substituted ammonium salts.

The water-soluble dye, when present in the ink alone or in combination with the pigment, may be present from about 0.05 to about 20%, by weight, preferably, from about 0.1 to about 8%, by weight, and more preferably, from about 0.5 to about 5%, by weight, based on the total weight of the ink.

POLYMER

The polymer may be present in the form of a dispersant for pigmented inks or may be added to the ink independent of the colorant, or both. As already noted, the polymer is of the same ionic character as the ink, i.e., cationic polymers for cationic inks and anionic polymers for anionic inks.

Polymers suitable for use in this invention may be homopolymers, copolymers, block polymers (such as AB, BAB or ABC block polymers), or branched or graft polymer, such as those described in U.S. Pat. No. 5,555,008; and U.S. Pat. No. 5,085,698; both incorporated herein by reference. Polymers particularly useful as polymeric dispersants include AB, BAB, or ABC block copolymers, or $A_x(BA)_yB_z$ graft copolymers wherein x is from 0 to about 10,000, y is from about 2 to about 10,000, and z is 0 to about 10,000. In AB or BAB block copolymers, the A segment is a hydrophobic homopolymer or copolymer which serves to link with the pigment and the B block is a hydrophilic homopolymer or copolymer, or salt thereof, which serves to disperse the pigment in the aqueous vehicle. ABC triblocks are also useful as pigment dispersants. In the ABC triblock, the A block is a polymer compatible with water, the B block is a polymer capable of binding to the pigment, and the C block is compatible with the organic solvent. The A and C blocks are end blocks. ABC triblocks and their synthesis are disclosed in European Patent Application 0 556 649 A1 published Aug. 28, 1993. In $A_x(BA)_yB_z$ graft copolymers, the A segments are hydrophobic homopolymers or copolymers which serve to link the pigment in the aqueous vehicle. Synthesis of graft structured copolymers has been disclosed in U.S. Pat. No. 5,006,582. Although random copolymers can be used as dispersing agents, they are not as effective in stabilizing pigment dispersions as the block polymers.

The amount of polymer and choice of counter ion depends on the desired structure, molecular weight and other properties of the polymer, and upon the other components of the ink composition. Useful polymers have a number average molecular weight of below 20,000, preferably below 10,000, and typically in the range of 1,000 to 6,000. Preferred block polymers have number average molecular weights in the range of 500 to 3000 for each block.

Generally, the polymer in dye-based inks is present in the range of approximately 0.05% to 25%, by weight, based on the weight of the total ink composition, preferably in the range of approximately 0.1% to 10%. If the polymer (either anionic or cationic) is used as a dispersant for the pigment, it may be present in the range of 0.1 to about 30%, preferably 0.1 to about 12%, by weight, based on the total weight of the ink composition. If the amount of polymer becomes too high, the ink color density will be unacceptable and it will become difficult to maintain desired ink viscosity. Dispersion stability of the pigment particles is adversely affected if insufficient polymer is present.

Preferably, when the colorant of choice is a pigment, the pigment to dispersant ratio (by wt.) for the carboxylic acid group containing polymeric dispersant, the sulfonic acid or phosphonic acid group containing dispersant, and the cationic polymeric dispersant, are: preferably, from about 0.7 to about 3.2, from about 0.7 to about 2.0, from about 0.7 to about 2.0; more preferably, from about 1.5 to about 2.8, from about 1.0 to about 1.8, from about 1.0 to about 1.8; and most preferably, from about 1.8 to about 2.4, from about 1.2 to about 1.5, and from about 1.2 to about 1.5; respectively.

Anionic Polymer

Some examples of hydrophobic monomers used in polymeric dispersants are methyl methacrylate, n-butyl methacrylate, 2-ethylhexyl methacrylate, benzyl methacrylate, 2-phenylethyl methacrylate, and the corresponding acrylates. Some examples of hydrophilic monomers containing neutralized carboxylic acid useful in preparing dispersants for the first ink are methacrylic acid and acrylic acid. Some examples of hydrophilic monomers containing sulfonate or phosphonate groups useful in preparing the dispersants for the second ink are 2-aminomethylpropane sulfonic acid (AMPS), styrene sulfonic acid, styrene sulfonate, sulfopropyl acrylate, sulfopropyl[meth]acrylate, and vinyl phosphonic acid.

The carboxylic acid group containing polymeric dispersants in the first ink may be neutralized as disclosed in U.S. Pat. No. 5,085,698. Preferably, the polymeric dispersant in the first ink is neutralized with dimethylethanolamine, sodium hydroxide, or potassium hydroxide.

The sulfonic acid or phosphonic acid groups in the dispersant in the second ink may be neutralized with organic bases such as mono-, di-, ad trimethylamine, morpholine; n-methyl morpholine; aminomethyl propanol; alcohol amines such as dimethylethanolamine (DMEA), methyldiethanolamine, mono-, di-, and trimethanolamine; pyridine; ammonium hydroxide; tetraalkylammonium salts such as tetramethylammonium hydroxide, tetraethylammonium hydroxide; and the oxides of alkali metals such as lithium, sodium, potassium, Cesium, Rubidium, and the like. Preferred neutralizing agents include dimethylethanolamine, diethylethanolamine, aminomethyl propanol, potassium hydroxide and sodium hydroxide.

Cationic Polymer

Cationic polymers particularly suited for use in this invention have a backbone prepared from ethylenically unsaturated units and having at least one, and preferably more than three, pendant ionic moieties derived from a cationic unit on the monomer and being of the general formula:

wherein A is N, P, or S; $R_1$, $R_2$, and $R_3$ are each independently H, alkyl or alkyl ether of 1–20 carbon atoms, or aryl or alkylaryl having 1–9 carbon atoms, with the proviso that $R_3$ is not present when A is S; and wherein X is an anion selected from the group consisting of halides, conjugate bases of organic acids, and conjugate bases of inorganic acids. The number of pendant ionic moieties should be sufficient to make the salt form of the cationic polymer soluble in the aqueous carrier medium. It will vary depending on the molecular weight of the polymer. The cationic polymer may also contain non-ionic ethylenically unsaturated monomers. The cationic polymers are further described in U.S. Pat. No. 5,555,008 which is incorporated herein by reference.

Preferred cationic polymers are the phosphate and tetraalkylammonium salts of homopolymers or copolymers of dialkylaminoethyl methacrylate, where alkyl is methyl to butyl. An especially useful cationic polymer is an AB block polymer with an A block prepared from homopolymers or copolymers of methyl methacrylate (MMA) and butyl methacrylate (BMA) and a B block prepared from homopolymers or copolymers of dimethylaminoethyl methacrylate (DMAEMA) or diethylaminoethyl methacrylate. Block polymers of MMA//MMA/DMAEMA (10//5/7.5) and BMA//DMAEMA (10//10) are particularly preferred, wherein a double slash indicates a separation between blocks, a single slash indicates a random copolymer, and the numerical values indicate the degree of polymerization of each monomer.

ACID ADDITIVE

When the use of a pH-sensitive bleed control mechanism is desired, an acid may be used in the inks at a concentration sufficient to allow for the pH-sensitive bleed control mechanism to be effective.

The acid additive is present in the ink containing the dispersant having the sulfonate or phosphonate groups (i.e., second ink). The acid additive is also optionally present in the fourth ink containing the anionic colorant.

The carboxylic acid additive is present in the second ink in an amount sufficient to provide the precipitation of the colorant in the first ink. The acid additive is present in the amount of about 0.2 to about 30%, preferably about 0.5 to about 5%, based on the total weight of the ink components.

The acid additive is optionally present in the fourth ink in amount from 0 to about 20%, preferably, from about 0.2 to about 8%, and most preferably, from about 0.5 to about 5%, based on the total weight of the ink components. When the carboxylic acid additive is present in the fourth ink, it is present in an amount sufficient to provide an ink having a pH in the range from about 2.7 to about 7, more preferably, from about 2.7 to about 4, most preferably from about 2.9 to about 3.5.

The organic acids suitably employed in the present ink-jet ink compositions include any of, or a mixture of two or more organic acids, of such compounds as, but not limited to, mono-, di-, and polyfunctional organic acids. In general, it is contemplated that any soluble organic acid having a $pK_a$ equal to or less than that of the pH-sensitive colorant of concern may be suitably employed. Preferably, the acid has a pKa up to about 3.5, and more preferably up to about 2.5. Preferably, one of the following classes of organic acids is employed: polyacrylic, acetic, glycolic, malonic, malic, maleic, ascorbic, succinic, glutaric, fumaric, citric, tartaric, lactic, bromoacetic, chloroacetic, chloropropionic, phthalic, sulfonic, and ortho-phosphoric acid and derivatives thereof. The organic acid component may also comprise mixtures of appropriate organic acids. The particular acid employed depends on the particular ink formulations. Glycolic, succinic, and citric acid are generally preferred, although any of the other organic acids may also be suitably employed in the practice of the invention.

PRECIPITATING AGENT

Precipitating agents are present in the fourth ink. Precipitate formation is facilitated by interaction between the precipitating agent and the carboxyl group of the dispersant in the first ink, and the sulfonyl and/or phosphonyl group of the dispersant in the second ink. Precipitate formation prevents the migration of the coloring agent from the first and/or the second ink into the adjacent print area produced by the fourth ink. In the preferred embodiment the precipitating agent consists of a multi-valent metal salt. Exemplary multi-valent metal cations suitable for use in the multi-valent metal salt include the following-cations listed below in Table 1, below:

TABLE 1

| Multi-valent metal cation groups | Multi-valent metal cations |
| --- | --- |
| Transition metals | $Cr^{+3}$, $Mn^{+2}$, $Fe^{+2}$, $Fe^{+3}$, $Co^{+3}$, $Ni^{+2}$, $Cu^{+2}$, $Zn^{+2}$, $Y^{+3}$, $CD^{+2}$ |
| Group IIA metals | $Mg^{+2}$, $Ca^{+2}$, $Sr^{+2}$, $Ba^{+2}$ |
| Group IIIA metals | $Al^{+3}$, $Ga^{+3}$, $In^{+3}$ |
| Lanthanoid metals | $La^{+3}$, $Pr^{+3}$, $Nd^{+3}$, $Sm^{+3}$, $Eu^{+3}$, $Gd^{+2}$, $Tb^{+3}$, $Dy^{+2}$, $Ho^{+3}$, $Er^{+3}$, $Tm^{+3}$, $YB^{+3}$, $Lu^{+3}$ |

Preferred metal cations suitable for use in the multi-valent metal salt include, but are not limited to, $Zn^{+2}$, $Mg^{+2}$, $Ca^{+2}$, $Cu^{+2}$, $Co^{+2}$, $Ni^{+2}$, $Fe^{+2}$, $La^{+3}$, $Nd^{+3}$, $Y^{+3}$, and $Al^{+3}$. Exemplary anions which may be coupled with these cations include but are not limited to $NO_3^-$, $F^-$, $Cl^-$, $Br^-$, $I^-$, $CH_3COO^-$, and $SO_4^{-2}$.

Preferably, the fourth ink composition will include from about 1 to about 15% by weight multi-valent metal salt, and most preferably from about 0.5 to about 5%.

OTHER INGREDIENTS

Consistent with the requirements for this invention, various types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEL (ICI America). Anionic, non-ionic, or amphoteric surfactants may also be used. A detailed list of non-polymeric surfactants as well as some polymeric surfactants are listed at pages 110–129, of 1990 McCutcheon's Functional Materials, North American Edition, Manufacturing Confection Publishing Co., Glen Rock, N.J. The choice of a specific surfactant is highly dependent on the particular ink composition and type of media substrate to be printed on. Cosolvents may be included to improve penetration of ink into the printing substrate and/or the performance of the ink-jet print cartridge (pen). Such cosolvents are well known in the art. Representative cosolvents that can be used are exemplified in U.S. Pat. No. 5,272,201. Other known additives such as viscosity modifiers and other acrylic or non-acrylic polymers may be added to improve various properties of the ink compositions as desired.

PRINTING SYSTEM

Figure 1:
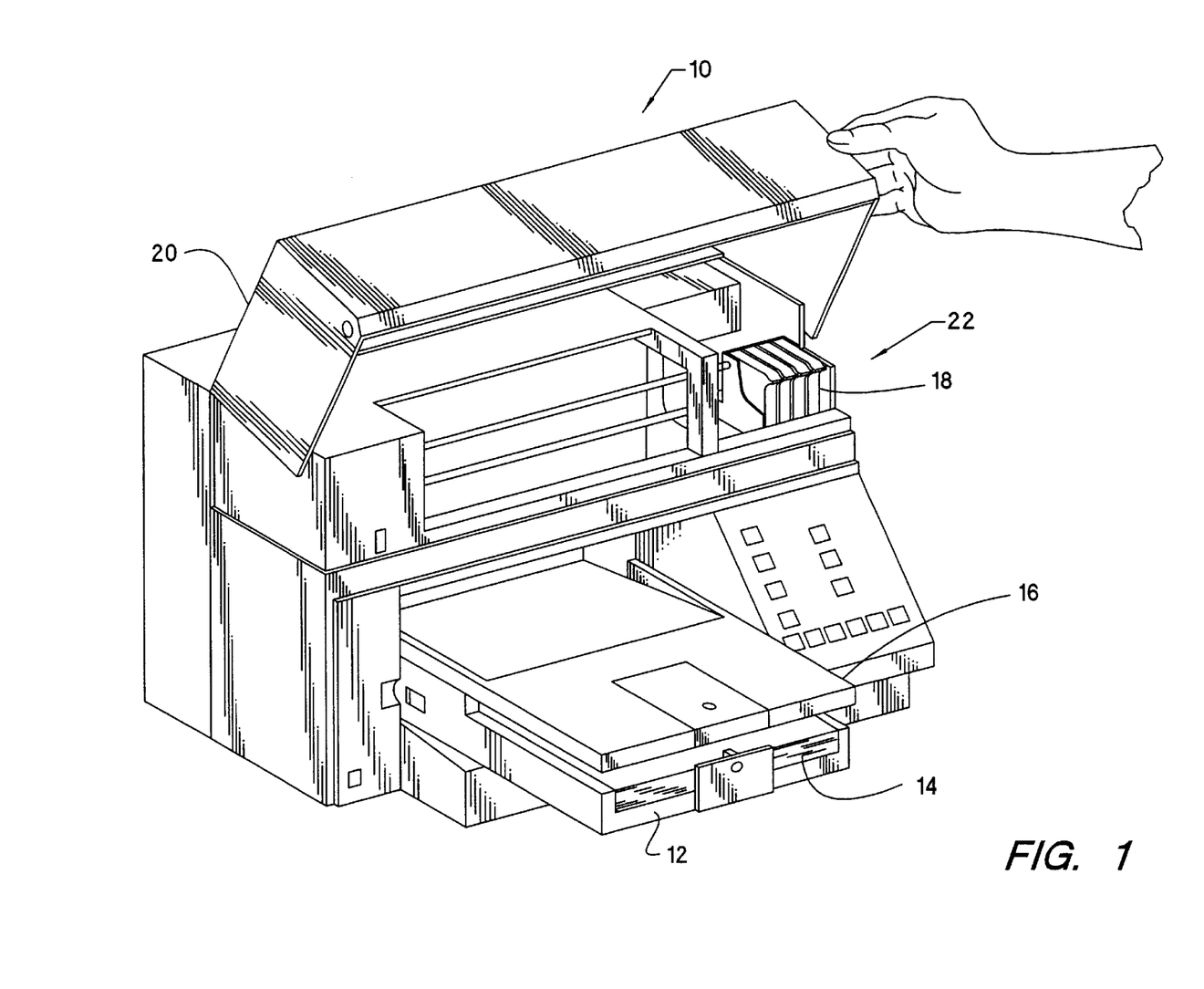
FIG. 1 is a perspective view of an exemplary ink-jet printer employed in the practice of the present invention.
Figure 2:
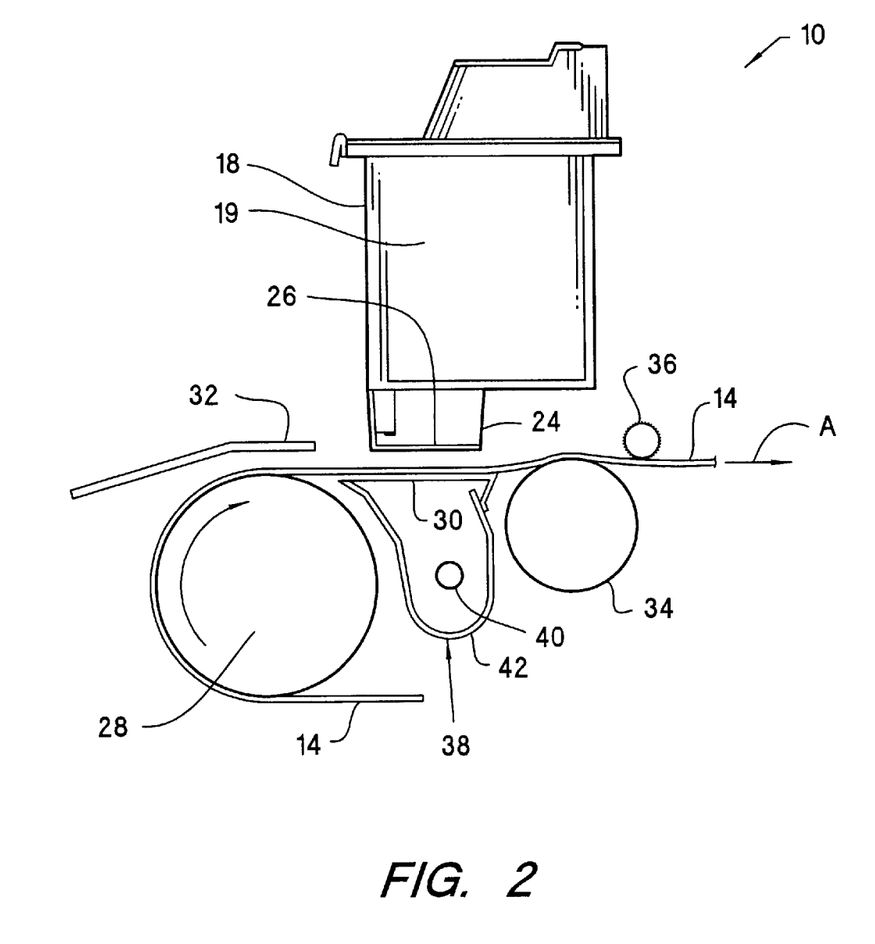
FIG. 2 is a schematic drawing of a portion of a thermal ink-jet printer, employing heating means, depicting the relationship of the pen with its printhead to the print medium and heating means.
Figure 3:
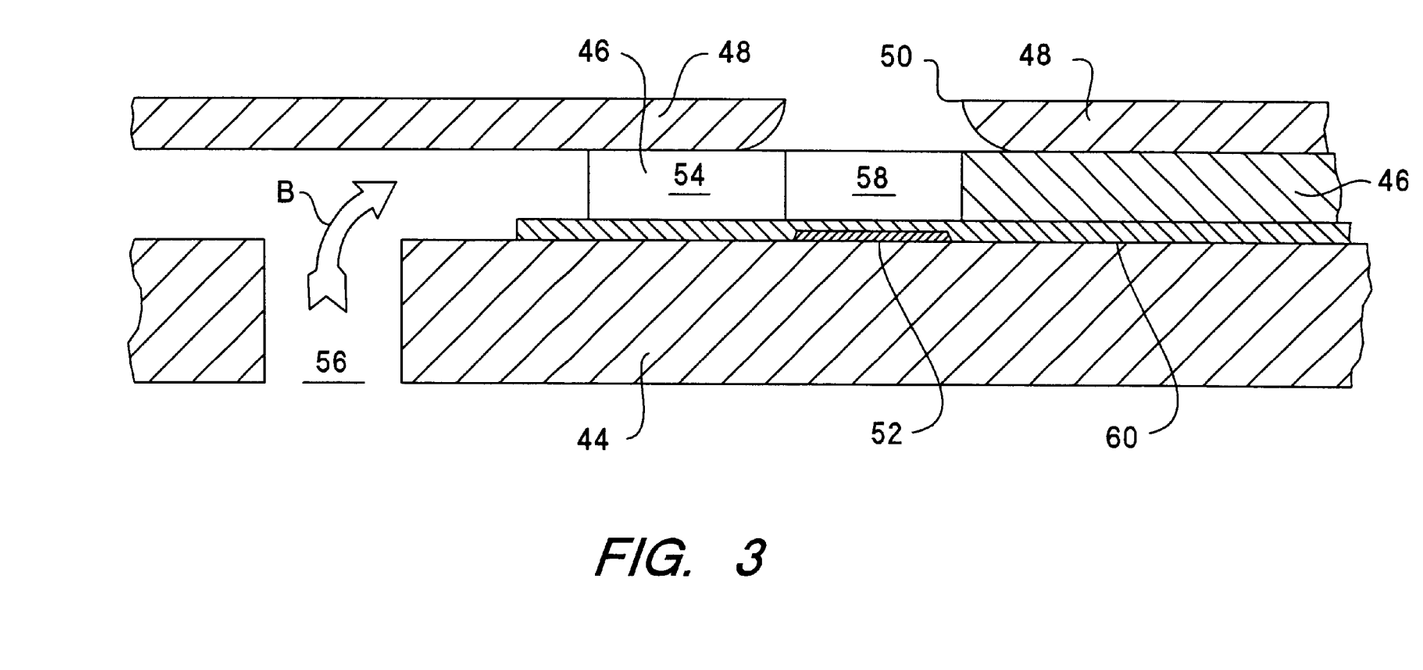
FIG. 3 is a cross-sectional view of a portion of a printhead in an ink-jet pen, depicting one resistor element and its associated nozzle.

Referring now to the FIGS. 1 through 3, a printer 10 is shown in FIG. 1, comprising a paper feed tray 12 for storing a supply of paper or other print medium 14 to be printed, a paper collection tray 16 for collecting the printer paper, and a plurality of print cartridges 18. In the printer depicted in FIG. 1, four such cartridges are provided: black, magenta, yellow, and cyan, commonly referred to as KMYC, although only three are visible from the viewing angle chosen. Together, these four colors provide a wide palette of colors, tints, and hues. However, it will be readily appreciated by those skilled in the art that black plus at least one of magenta, yellow, and cyan may be employed in certain situations. Furthermore, additional color pens such as white may also be employed in certain printing applications.

The printer 10 is depicted with its cover 20 raised to expose the service station 22 and the four cartridges 18 stored therein. Other features of the printer 10, such as the paper feed mechanism, printer electronics, etc., are not depicted, as they are well known of ink-jet printing; see, e.g., U.S. Pat. No. 4,872,026.

The print cartridges 18 reside in the service station when not in use or for servicing, which may include priming the pen, wiping the nozzle plate, and/or spitting all nozzle simultaneously into a spittoon to clear them.

The print cartridges may be based on thermal jetting action, employing a plurality of ink firing chambers, each containing a resistor element that, upon energizing, causes a bubble of ink to form, which is expelled through a nozzle toward the print medium. Alternatively, the print cartridge may be based on piezoelectric jetting action, employing a plurality of ink firing chambers, each containing a piezoelectric element that, upon energizing, expels a quantity of ink through a nozzle toward the print medium. Both thermal and piezoelectric print cartridges are well known in the art of ink-jet printing. Preferably, a thermal ink-jet printer is employed in the practice of the present invention.

In the use of an ink-jet printer, the platen may be at ambient temperature or the platen may be heated. A heated platen in conjunction with a thermal ink-jet printer has been disclosed and claimed in application Ser. No. 07/876,942, filed May 1, 1992, and in U.S. Pat. No. 5,479,199, entitled "Print Area Radiant Heater For Ink-Jet Printer," both assigned to the same assignee as the present application. Heated platens are used to dry the ink faster on the print medium, which may be paper, transparency, or other suitable material.

FIG. 2 depicts a portion of the ink-jet printer 10 shown in FIG. 1, which is provided with a heated platen means. Specifically, the print medium is moved past the print cartridge, 18 having an ink reservoir 19 and a a printhead 24 in operative association with the print medium 14. The printhead 24 establishes a print zone 26. As is customary, the print medium 14 is moved along a paper path in the printer 10, in the direction denoted by arrow A, and the pen 18 is moved orthogonal thereto. The print medium 14 is moved by a drive roller 28 onto a screen 30. A drive plate 32, positioned after the drive roller 28 and prior to the pen 18 aids in holding the print medium 14 flat on the screen 30. The screen 30, which acts like a platen, is perforated so as to permit the drying of the print medium, as described more fully below. The print medium 14 exits the print zone 26 by means of an exit roller 34 and a plurality of starwheels 36 to be collected in the paper collection means, such as tray 16.

The configuration of the cartridges is immaterial in the practice of the present invention, and may comprise two, three, four, or more separate cartridges (as depicted in FIG. 1, where each ink color is in an independently replaceable cartridge) or may comprise one print cartridge with two, three, four, or more ink reservoirs, each reservoir containing a different ink. As used herein, the term "cartridge" is intended to cover situations involving: a cartridge having one or multiple ink reservoirs, wherein the multiple reservoirs may be separately replaceable or integral to one another thus replaceable as a unit; a cartridge having a printhead and a reservoir (or multiple reservoirs) wherein the printhead is integral to the reservoir (or multiple reservoirs), and a cartridge having a printhead and a separately replaceable reservoir (or multiple reservoirs). In the case where the one or multiple ink reservoirs are separately replaceable from the printhead (not integral to the printhead) the one or multiple reservoirs maybe individually replaceable or tube-fed with ink from an off-axis ink supply.

The set of ink-jet cartridges of the present invention include inks according to the present invention, as described above. Thus, for each first through fourth ink, there is a corresponding ink-jet cartridge containing one of the first through fourth inks.

A recent modification in thermal ink-jet printers involves the use of a heating means, generally depicted at 38, which is positioned close to the print zone 18. In FIG. 2, the heating means 38 is depicted as comprising a print heater 40 and a reflector 42, which serves to concentrate the heat on the bottom of the print medium 14, through the screen 30. However, it will be readily apparent to those skilled in the art that the heating means 38 may comprise any of the usual heating sources, such as heating elements, blowers, and the like, and the practice of the present invention is not limited as to the heating source. Nor is the present invention limited to the placement of the heating source 38, which may be ahead of the print zone 26, behind the print zone, or in the print zone or which may be located beneath the print medium 14, as shown, or above it.

FIG. 3 depicts in cross-section a portion of the printhead 24, comprising a substrate 44, a barrier layer 46, and an orifice, or nozzle, plate 48 with an orifice, or nozzle, 50 therein. The nozzle 50 is positioned above a thermal element 52, commonly a resistor element, or heater-resistor. In practice, the orifice plate 48 has a plurality of nozzles 50 in it, each one operatively associated with a resistor 52, as is well-known. The present invention is not limited to the particular orifice plate 48 employed, which may be separate or integral with the barrier layer 46. Indeed, any orifice plate overlying the thermal element 52 may be employed in the practice of the present invention.

In operation, ink fills an ink feed channel 54, as shown by arrow B; each resistor is fed by such a channel, which is defined by the substrate 44, the barrier layer 46, and the orifice plate 48. Each resistor 52 is connected by an electrically conductive trace (not shown) to a current source (not shown), which, under the control of a microprocessor (not shown), sends current pulses to selected resistors 52, causing a droplet of ink to be expelled through the nozzle 50 and onto the print medium 14 in a desired pattern of alphanumeric characters, graphics, area-fill, and other print patterns. The details of such thermal ink-jet printers are described, for example, in the Hewlett-Packard Journal, Vol. 45, No. 1 (February 1994).

As further shown in FIG. 3, the ink flows up from through ink refill slot 56, into the ink feed channel 54, and thence into firing chamber 58. A passivation layer 60 lies over the substrate 44 and the resistor 52. This passivation layer 60 typically comprises a silicon nitride-silicon carbide material, as is well-known. Additionally, there are several other layers in the thin film construction of a thermal ink-jet printhead; these are omitted from the drawing for clarity.

In one embodiment, and in accordance with the present invention, the first, second, and the third inks are pigment based and represent the black, magenta, and yellow colors. The fourth ink is dye-based and provides the cyan colored ink.

EXAMPLES

INKS

To demonstrate the effectiveness of the present invention, two sets of inks were evaluated, each set comprising black, magenta, yellow, and cyan inks. The first set, Control, comprised commercially available inks associated with Hewlett-Packard print cartridges, part numbers 51645A (black) and 51641A (tri-chamber color). The second set comprised an ink set prepared according to the present invention, wherein each ink comprised an aqueous vehicle and the ingredients listed below:

Black Ink:
  Carbon black pigment dispersed with a neutralized carboxylated dispersant having a pH of about 8;

Magenta Ink:
  Pigment Red 122 (PR122) available from Sun Chemical; the pigment was dispersed with a neutralized sulfonated dispersant AMPS/MA//g-BzMA/ET 25/45g-18/12 (// separates the backbone from the pendent group); Glycolic acid, and an ink pH of about 3; and Acid Red 52 dye;

Yellow Ink:
  Yellow pigment 17 (PY17) available from Sun Chemical; the pigment was dispersed with cationic dispersant BzMA//DMAEMA/ETEGMA 10//20/3 and neutralized with $H_3PO_4$, with an ink pH of about 3;

Cyan Ink:
  Direct Blue 199 (anionic dye) and Acid Blue 9 dyes associated with TMA (tetramnethylammonium), $Mg(NO_3)_2$, and Glycolic acid, with a pH of about 3.

The aqueous vehicle comprised water and water-soluble organic solvents and other ingredients commonly employed in formulating ink-jet inks.

BLEED EVALUATION

Color-to-color and Black-to-Color bleed were evaluated by printing blocks of differing colors adjacent one another on five different brands of plain paper, using a Hewlett-Packard DeskJet printer and print cartridges having similar drop volumes. The printed samples were thereafter visually evaluated for bleed from a block printed with one ink into the adjacent block printed with another ink color. For every given ink color (e.g., black (K), cyan (C), magenta (M), yellow (Y), red (R), green (G), and blue (B)) a total score was obtained by adding the individual scores for that ink, and the data is reported in Table 2. Lower scores represent less bleed, hence more desirable. Another total score for the performance of each ink on all papers was further obtained by adding the total score for each ink on all five papers, and the data is reported in Table 3. For example, Table 2 below describes the bleed performance for Ink Sets 1 and 2 on OJIS paper. The data in each column represents the bleed from the block printed with a given ink into adjacent blocks printed with the other inks. For example, the first column of numbers represents the bleed from a block of cyan into adjacent blocks printed with black, magenta, cyan (not applicable), yellow, red, green, and blue, respectively.

Similarly, the results of black to color bleed for Ink Sets 1 and 2 are represented in Tables 4 and 5 below.

As can be seen from the data in Tables 2 through 5, Ink Set 2, prepared according to the present invention exhibited significantly better bleed alleviation than Ink Set 1.

TABLE 2

| | C to | M to | Y to | R to | G to | B to |
|---|---|---|---|---|---|---|
| | | | Media OJIS | | | |
| | | | INK SET 1[1] | | | |
| K | 2 | 2 | 3 | 1 | 1 | 1 |
| C | N/A | 1 | 1 | 1 | 1 | 2 |
| M | 2 | N/A | 2 | 2 | 2 | 2 |
| Y | 2 | 2 | N/A | 2 | 2 | 2 |
| R | 2 | 1 | 2 | N/A | 2 | 2 |
| G | 2 | 2 | 2 | 2 | N/A | 2 |
| B | 1 | 1 | 2 | 1 | 2 | N/A |
| | | | TOTAL 62 | | | |
| | | | INK SET 2 | | | |
| K | 1 | 2 | 3 | 2 | 1 | 1 |
| C | N/A | 2 | 2 | 2 | 1 | 1 |
| M | 2 | N/A | 1 | 1 | 2 | 2 |
| Y | 2 | 1 | N/A | 1 | 1 | 2 |
| R | 1 | 2 | 2 | N/A | 1 | 1 |
| G | 1 | 2 | 2 | 2 | N/A | 1 |
| B | 1 | 1 | 1 | 1 | 1 | N/A |
| | | | TOTAL 53 | | | |

[1]Visual Inspection Rating:
1 = No bleed; 2 = Slight bleed; 3 = Some bleed; 4 = Sever bleed.

TABLE 3

| PAPER[2] | INK SET 1 | INK SET 2 |
|---|---|---|
| H.Mill | 71 | 60 |
| CDCY | 69 | 57 |
| UCJT | 55 | 53 |
| OJIS | 62 | 53 |
| GBND | 67 | 56 |
| TOTAL | 324 | 279 |

[2]Papers
H.Mill: Hammermill; CDCY: Champion Data Copy; UCJT: Union Camp Jamestown; OJIS: Oji Sunace PPC; GBND: Gilbert Bond

TABLE 4

|   | H.Mill K to | CDCY K to | UCJT K to | OJIS K to | GBND K to |
|---|---|---|---|---|---|
| INK SET 1 | | | | | |
| C | 2 | 2 | 3 | 2 | 1 |
| M | 2 | 2 | 3 | 2 | 1 |
| Y | 3 | 3 | 3 | 3 | 2 |
| R | 2 | 2 | 2 | 2 | 1 |
| G | 2 | 1 | 2 | 1 | 1 |
| B | 1 | 1 | 1 | 1 | 2 |
| TOTAL | 12 | 11 | 14 | 11 | 8 |
| INK SET 2 | | | | | |
| C | 1 | 1 | 1 | 1 | 1 |
| M | 2 | 3 | 1 | 2 | 1 |
| Y | 3 | 3 | 3 | 3 | 2 |
| R | 1 | 1 | 4 | 2 | 1 |
| G | 1 | 1 | 1 | 1 | 1 |
| B | 1 | 1 | 1 | 1 | 1 |
| TOTAL | 9 | 10 | 11 | 10 | 7 |

TABLE 5

| PAPER | INK SET 1 | INK SET 2 |
|---|---|---|
| H.Mill | 12 | 9 |
| CDCY | 11 | 10 |
| UCJT | 14 | 11 |
| OJIS | 11 | 10 |
| GBND | 8 | 7 |
| TOTAL | 56 | 47 |

LIGHTFADE EVALUATION

Lightfade was measured by printing a color palette for Ink Sets 1 and 2 on two papers in triplicate. The color palette comprised cyan, magenta, yellow, red, green, and blue 100% area-filled squares of approximately 1 cm² using ink-jet pens having similar drop volumes. The color coordinates, L*, a*, and b* of the printed images were measured using a commercial calorimeter and standard color measurement procedures. One set of prints was exposed to the equivalent of 1 year indoor while another set was exposed to the equivalent of several weeks of outdoor exposure, using commercially available fadometers and weatherometers as determined by the manufacturer's instructions. Lightfade, represented by ΔE, for each ink set was calculated using Equation 1, below, and the data is reported in Table 6, below:

$$\Delta E = [(L^*_{after} - L^*_{before})^2 + (a^*_{after} - a^*_{before})^2 + (b^*_{after} - b^*_{before})^2]^{1/2} \quad \text{Equation 1}$$

The subscripts "after" and "before" refer to measurements after and before the print samples were exposed to lightfade environments. It is desirable that the lightfade value be minimized.

TABLE 6

| | | | INDOOR DELTA E | | OUTDOOR DELTA E | |
|---|---|---|---|---|---|---|
| Ink Set | Paper[1] | Color Gamut | Average for all colors[2] | Worst single lightfade[3] | Average for all colors[2] | Worst single lightfade[3] |
| 1 | Bright Bond | 730 | 21.88 | 30.53 | n/a | n/a |
|   | Heavy Coated | 1120 | 20.47 | 22.55 | 35.41 | 47.00 |
| 2 | Bright Bond | 730 | 16.67 | 27.64 | n/a | n/a |
|   | Heavy Coated | 1060 | 16.10 | 23.58 | 23.81 | 29.79 |

[1]Bright Bond = Azon Bright White Opaque Bond, Part# 130400; Heavy Coated = HP Heavy Weight Inkjet Paper, Part# 51648E.
[2]Lightfade calculated for all 6 colors.
[3]Lightfade for the single worst color.

As evidenced by the data in Table 6, the ink set formulated according to the present invention exhibited excellent lightfastness.

INDUSTRIAL APPLICABILITY

The present printing system and set of print cartridges are expected to find commercial use in ink-jet printing.

Thus, there has been disclosed an ink-jet printing system and a set of print cartridges. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A set of ink-jet cartridges, comprising:
   a first ink-jet cartridge, said first cartridge comprising
      a first anionic ink comprising
         an aqueous vehicle,
         at least one first colorant, and
         at least one first anionic polymer;
   a second ink-jet cartridge, said second cartridge comprising
      a second anionic ink comprising
         an aqueous vehicle;
         at least one second colorant,
         at least one second anionic polymer, and
         an acid additive having a pKa up to the pKa of the at least first polymer of the first ink;
   a third ink-jet cartridge, said second cartridge comprising
      a third cationic ink comprising
         an aqueous vehicle,
         at least one third colorant,
         at least one third cationic polymer, and
         a pH in the range from about 2 to about 5; and
   a fourth ink-jet cartridge, said second cartridge comprising
      a fourth anionic ink comprising
         an aqueous vehicle,
         at least one fourth anionic dye, and
         a precipitating agent.

2. The set of claim 1 wherein
   said at least one first anionic polymer has at least one neutralized carboxylic acid group; and
   said at least one second anionic polymer has at least one sulfonate or phosphonate group.

3. The set of claim 2 wherein the first, second, and third polymers are independently selected from the group consisting of homopolymer, copolymer, block polymer, branched polymer, and graft polymer.

4. The set of claim 3 wherein at least one of the at least first, second, and third colorants are independently selected pigments; and wherein at least one of the at least one first anionic polymer, the at least one second anionic polymer, and the at least one third cationic polymer, also serves as a pigment dispersant.

5. The set of claim 4 wherein said at least one third cationic polymer has at least one pendent ionic moiety of the formula wherein A is selected from the group consisting of N, P, and S; $R_1$, $R_2$ and $R_3$ are independently selected from the group consisting of H, alkyl or alkyl ether of 1–20 carbon atoms, and aryl or alkylaryl of 1–10 carbon atoms, wherein $R_3$ is not present when A is S; and wherein X is selected from the group consisting of halides, conjugate bases of organic acids, and conjugate bases of inorganic acids.

6. The set of claim 5 wherein the at least one cationic polymer is an AB block polymer.

7. The set of claim 6 wherein the at least one cationic AB block polymer comprises an A block prepared from homopolymers or copolymers of methyl methacrylate and butyl methacrylate and a B block prepared from homopolymers or copolymers of dimethylaminoethyl methacrylate and diethylaminoethyl methacrylate.

8. The set of claim 4 wherein the at least first and second polymers are selected from the group consisting of AB, BAB, and ABC block copolymers, and Ax(BA)yBz graft copolymers wherein x is from 0 to about 10,000, y is from about 2 to about 10,000, and z is 0 to about 10,000.

9. The set of claim 2 wherein the acid additive is an organic acid selected from the group consisting of polyacrylic, acetic, glycolic, malonic, malic, maleic, ascorbic, succinic, glutaric, fumaric, citric, tartaric, lactic, bromoacetic, chloroacetic, chloropropionic, phthalic, sulfonic, and ortho-phosphoric acid and derivatives thereof.

10. The set of claim 2 wherein the precipitating agent is a multi-valent metal salt comprising a multi-valent metal cation selected from the group consisting of $Zn^{+2}$, $Mg^{+2}$, $Ca^{+2}$, $Cu^{+2}$, $Co^{+2}$, $Ni^{+2}$, $Fe^{+2}$, $La^{+3}$, $Nd^{+3}$, $Y^{+3}$, and $Al^{+3}$.

11. The set of claim 2 wherein the fourth anionic colorant further comprises an acid additive.

12. An ink-jet printing system, comprising a set of ink-jet inks, said ink-jet inks comprising:

a first anionic ink comprising
an aqueous vehicle,
at least one first colorant, and
at least one first anionic polymer;

a second anionic ink comprising
an aqueous vehicle;
at least one second colorant,
at least one second anionic polymer, and
an acid additive having a pKa up to the pKa of the at least first polymer of the first ink;

a third cationic ink comprising
an aqueous vehicle,
at least one third colorant,
at least one third cationic polymer, and
a pH in the range from about 2 to about 5; and a fourth anionic ink comprising
an aqueous vehicle,
at least one fourth anionic dye, and
a precipitating agent.

13. The printing system of claim 12 wherein
said at least one first anionic polymer has at least one neutralized carboxylic acid group; and
said at least one second anionic polymer has at least one sulfonate or phosphonate group.

14. The printing system of claim 13 wherein the first, second, and third polymers are independently selected from the group consisting of homopolymer, copolymer, block polymer, branched polymer, and graft polymer.

15. The printing system of claim 14 wherein at least one of the at least first, second, and third colorants are independently selected pigments; and wherein at least one of the at least one first anionic polymer, the at least one second anionic polymer, and the at least one third cationic polymer, also serves as a pigment dispersant.

16. The printing system of claim 15 wherein said at least one third cationic polymer has at least one pendent ionic moiety of the formula wherein A is selected from the group consisting of N, P, and S; $R_1$, $R_2$ and $R_3$ are independently selected from the group consisting of H, alkyl or alkyl ether of 1–20 carbon atoms, and aryl or alkylaryl of 1–10 carbon atoms, wherein $R_3$ is not present when A is S; and wherein X is selected from the group consisting of halides, conjugate bases of organic acids, and conjugate bases of inorganic acids.

17. The printing system of claim 16 wherein the at least one cationic polymer is an AB block polymer.

18. The printing system of claim 17 wherein the at least one cationic AB block polymer comprises an A block prepared from homopolymers or copolymers of methyl methacrylate and butyl methacrylate and a B block prepared from homopolymers or copolymers of dimethylaminoethyl methacrylate and diethylaminoethyl methacrylate.

19. The printing system of claim 15 wherein the at least first and second polymers are selected from the group consisting of AB, BAB, and ABC block copolymers, and Ax(BA)yBz graft copolymers wherein x is from 0 to about 10,000, y is from about 2 to about 10,000, and z is 0 to about 10,000.

20. The printing system of claim 13 wherein the acid additive is an organic acid selected from the group consisting of polyacrylic, acetic, glycolic, malonic, malic, maleic, ascorbic, succinic, glutaric, fumaric, citric, tartaric, lactic, bromoacetic, chloroacetic, chloropropionic, phthalic, sulfonic, and ortho-phosphoric acid and derivatives thereof.

21. The printing system of claim 13 wherein the precipitating agent is a multi-valent metal salt comprising a multi-valent metal cation selected from the group consisting of $Zn^{+2}$, $Mg^{+2}$, $Ca^{+2}$, $Cu^{+2}$, $Co^{+2}$, $Ni^{+2}$, $Fe^{+2}$, $La^{+3}$, $Nd^{+3}$, $Y^{+3}$, and $Al^{+3}$.

22. The printing system of claim 13 wherein the fourth anionic colorant further comprises an acid additive.

* * * * *